0

(12) United States Patent
Hwang et al.

(10) Patent No.: US 9,767,936 B2
(45) Date of Patent: Sep. 19, 2017

(54) ELECTRICALLY CONDUCTIVE THIN FILMS

(71) Applicant: SAMSUNG ELECTRONICS CO., LTD., Suwon-si, Gyeonggi-do (KR)

(72) Inventors: Sungwoo Hwang, Seoul (KR); Kimoon Lee, Seoul (KR); Doh Won Jung, Seoul (KR); Sang Il Kim, Seoul (KR); Kyoung-Seok Moon, Hwaseong-si (KR); Woojin Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 79 days.

(21) Appl. No.: 14/740,583

(22) Filed: Jun. 16, 2015

(65) Prior Publication Data

US 2015/0380122 A1    Dec. 31, 2015

(30) Foreign Application Priority Data

Jun. 27, 2014   (KR) .................. 10-2014-0080189

(51) Int. Cl.
  *H01B 1/02*   (2006.01)
  *C01B 19/00*  (2006.01)
  *C01B 19/02*  (2006.01)
  *C04B 35/547* (2006.01)

(52) U.S. Cl.
  CPC ............ *H01B 1/02* (2013.01); *C01B 19/002* (2013.01); *C01B 19/02* (2013.01); *C04B 35/547* (2013.01); *C01P 2002/72* (2013.01); *C01P 2004/24* (2013.01); *C01P 2006/40* (2013.01); *C01P 2006/60* (2013.01); *C04B 2235/404* (2013.01); *C04B 2235/405* (2013.01); *C04B 2235/408* (2013.01); *C04B 2235/42* (2013.01); *C04B 2235/428* (2013.01); *C04B 2235/6562* (2013.01); *C04B 2235/6565* (2013.01); *C04B 2235/6567* (2013.01); *C04B 2235/662* (2013.01); *C04B 2235/76* (2013.01)

(58) Field of Classification Search
  None
  See application file for complete search history.

(56) References Cited

U.S. PATENT DOCUMENTS

| | | | |
|---|---|---|---|
| 5,051,204 A | 9/1991 | Ohsawa et al. | |
| 5,236,691 A | 8/1993 | Franzen et al. | |
| 8,518,364 B2 | 8/2013 | Tenne et al. | |
| 2012/0138887 A1 | 6/2012 | Zhang et al. | |
| 2013/0125988 A1 | 5/2013 | Cao et al. | |

FOREIGN PATENT DOCUMENTS

JP          1994011642 A      9/1990

OTHER PUBLICATIONS

Boroushian. Electrochemistry of Metal Chalcogenides; © Springer-Verlag Berlin Heidelberg 2010, front matter and pp. 1-349.*

* cited by examiner

*Primary Examiner* — Katie L Hammer
(74) *Attorney, Agent, or Firm* — Cantor Colburn LLP (57) ABSTRACT

An electrically conductive thin film including a compound represented by Chemical Formula 1 and having a layered crystal structure:

$$A_xM_yCh_z \qquad \text{Chemical Formula 1}$$

wherein A is V, Nb, or Ta, M is Ni, Co, Fe, Pd, Pt, Ir, Rh, Si, or Ge, Ch is S, Se, or Te, x is a number from 1 to 3, y is a number from 1 to 3, and z is a number from 2 to 14.

15 Claims, 6 Drawing Sheets
(2 of 6 Drawing Sheet(s) Filed in Color)

ELECTRICALLY CONDUCTIVE THIN FILMS

CROSS REFERENCE TO RELATED APPLICATION

This application claims priority to and the benefit of Korean Patent Application No. 10-2014-0080189, filed in the Korean Intellectual Property Office on Jun. 27, 2014, and all the benefits accruing therefrom under 35 U.S.C. §119, the entire content of which is incorporated herein by reference.

BACKGROUND

1. Field

Electrically conductive thin films and an electronic device including the same are disclosed.

2. Description of the Related Art

An electronic device like a flat panel display such as an LCD or LED, a touch screen panel, a solar cell, a transparent transistor, and the like includes an electrically conductive thin film or a transparent electrically conductive thin film. A material for an electrically conductive thin film may be required to have, for example, high light transmittance of greater than or equal to about 80% and low specific resistance of less than or equal to about 100 $\mu\Omega$*cm in a visible light region. The currently-used material for an electrically conductive thin film includes oxides such as indium tin oxide (ITO), tin oxide ($SnO_2$), zinc oxide (ZnO), and the like.

The indium tin oxide is a type of degenerate semiconductor and has a wide band gap of 3.75 eV. The ITO may be prepared as a large area film via sputtering process but has poor flexibility and will inevitably cost more due to limited reserves of indium. Therefore, development of an alternative material is desired. The tin oxide and the zinc oxide show low conductivity and have poor flexibility.

Developing a non-oxide material for a flexible and stable transparent electrode having high transparency and excellent electrical conductivity is desired for a flexible electronic device (such as a bendable or foldable electronic device), which has drawn growing attention as a next generation electronic device.

SUMMARY

An embodiment provides a flexible and electrically conductive thin film having high conductivity and excellent light transmittance.

Another embodiment provides an electronic device including the electrically conductive thin film.

In an embodiment, an electrically conductive thin film includes a compound represented by Chemical Formula 1 and having a layered crystal structure:

$$A_xM_yCh_z \qquad \text{Chemical Formula 1}$$

wherein A is V, Nb, or Ta, M is Ni, Co, Fe, Pd, Pt, Ir, Rh, Si, or Ge, Ch is S, Se, or Te, x is a number from 1 to 3, y is a number from 1 to 3, and z is a number from 2 to 14.

The compound represented by Chemical Formula 1 may include a compound represented by any of Chemical Formulas 2 to 10:

$$AMTe_z \qquad \text{Chemical Formula 2}$$

wherein A is V, Nb, or Ta, M is Ni, Co, Fe, Pd, Pt, Ir, Rh, Si, or Ge, and z is 2 or 5;

$$A_3MTe_6 \qquad \text{Chemical Formula 3}$$

wherein A is V, Nb, or Ta, and M is Si or Ge;

$$A_2MTe_4 \qquad \text{Chemical Formula 4}$$

wherein A is V, Nb, or Ta, and M is Si or Ge;

$$AMTe_4 \qquad \text{Chemical Formula 5}$$

wherein A is V, Nb, or Ta, and M is Pd, Pt, Ir, Rh, or Ir;

$$AM_2Te_2 \qquad \text{Chemical Formula 6}$$

wherein A is V, Nb, or Ta, and M is Ni, Co, or Fe;

$$A_3M_3Te_{14} \qquad \text{Chemical Formula 7}$$

wherein A is V, Nb, or Ta, and M is Ni, Co, Fe, Pd, Pt, Ir, or Rh;

$$AM_xTe_3 \qquad \text{Chemical Formula 8}$$

wherein A is V, Nb, or Ta, M is Ni, Co, Fe, Pd, Pt, Ir, or Rh, and x is 1 or 2; or $$A_2M_3Te_5 \qquad \text{Chemical Formula 9}$$

wherein A is V, Nb, or Ta, and M is Ni, Co, Fe, Pd, Pt, Ir, or Rh; and $$A_2MCh_z \qquad \text{Chemical Formula 10}$$

wherein A is V, Nb, or Ta, M is Ni, Co, Fe, Pd, Pt, Ir, or Rh, Ch is S or Se, and z is 5 or 6.

The electrically conductive thin film may have transmittance of greater than or equal to about 80 percent (%) for light having a wavelength of 550 nanometers (nm) at a thickness of 50 nm or less.

The compound may include $NbPdTe_5$, $NbNiTe_5$, $TaPtTe_5$, $TaNiTe_5$, $NbCoTe_2$, $NbNiTe_2$, $NbFeTe_2$, $TaCoTe_2$, $TaNiTe_2$, $Nb_3SiTe_6$, $Nb_3GeTe_6$, $Nb_2SiTe_4$, $Nb_2GeTe_4$, $TaRuTe_4$, $TaRhTe_4$, $TaIrTe_4$, $NbIrTe_4$, $TaCo_2Te_2$, $TaNi_2Te_2$, $Ta_3Pd_3Te_{14}$, $TaFeTe_3$, $TaNi_2Te_3$, $Ta_2Pd_3Te_5$, $Ta_2PdS_6$, $Ta_2PdSe_6$, $Ta_2NiSe_6$, $Ta_2NiS_6$, $Nb_2PdSe_6$, $Nb_2PdS_6$, or a combination thereof.

The electrically conductive thin film may include a monocrystal of the compound represented by Chemical Formula 1.

The electrically conductive thin film may have an electrical conductivity of greater than or equal to about 1000 Siemens per centimeter (S/cm).

The electrically conductive thin film may have an electrical conductivity of greater than or equal to about 6000 S/cm.

The compound may have a product of an absorption coefficient ($\alpha$) for light having a wavelength of 550 nm at 25° C. and a resistivity value ($\rho$) thereof of less than or equal to about 200 ohms per square ($\Omega/\square$).

The compound may have a product of an absorption coefficient ($\alpha$) for light having a wavelength of 550 nm at 25° C. and a resistivity value ($\rho$) thereof of less than or equal to about 20$\Omega/\square$.

The layered crystal structure may belong to an orthorhombic system and have a space group of Cmcm (63), an orthorhombic system and have a space group of Pnma (62), an orthorhombic system and have a space group of Cmca (64), an orthorhombic system and have a space group of Pma2 (28), an orthorhombic system and have a space group of Pmna (53), a monoclinic system and have a space group of $P2_1/c$ (14), a monoclinic system and have a space group of C2/m (12), a monoclinic system and have a space group of I12/m1(12), or a monoclinic system and have a space group of C2/c (15).

The electrically conductive thin film may include a plurality of nanosheets including the compound, and the nanosheets may contact each other to provide an electrical connection therebetween.

The electrically conductive thin film may include a continuous deposition film including the compound represented by Chemical Formula 1.

The electrically conductive thin film may have a thickness of less than or equal to about 100 nm.

Another embodiment provides an electronic device including an electrically conductive thin film comprising a compound represented by Chemical Formula 1 and having a layered crystal structure:

Chemical Formula 1 wherein A is V, Nb, or Ta, M is Ni, Co, Fe, Pd, Pt, Ir, Rh, Si, or Ge, Ch is S, Se, or Te, x is a number from 1 to 3, y is a number from 1 to 3, and z is a number from 2 to 14.

The electronic device may be a flat panel display, a touch screen panel, a solar cell, an e-window, an electrochromic mirror, a heat mirror, a transparent transistor, or a flexible display.

According to an embodiment, the electrically conductive thin film may include a ternary chalcogenide represented by Chemical Formula 1 and have a layered crystal structure, and may exhibit a relatively high conductivity, excellent light transmittance, and improved flexibility. The ternary chalcogenide included in the electrically conductive thin film may have a layered crystal structure and a conductivity that allows it to be used as an electrode material (e.g., greater than about 1000 S/cm). In addition, the electrically conductive thin film may provide a relatively high level of light transmittance (e.g., about 80% or higher) together with mechanical flexibility.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, advantages and features of this disclosure will become more apparent by describing in further detail exemplary embodiments thereof with reference to the accompanying drawings, in which.

DETAILED DESCRIPTION

Advantages and characteristics of this disclosure, and a method for achieving the same, will become evident referring to the following exemplary embodiments together with the drawings attached hereto. However, this disclosure may be embodied in many different forms and is not to be construed as limited to the embodiments set forth herein; rather, these embodiments are provided so that this disclosure will be full and complete. Therefore, in some embodiments, well-known process technologies are not explained in detail for clarity. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations.

Unless otherwise defined, all terms (including technical and scientific terms) used herein have the same meaning as commonly understood by one of ordinary skill in the art to which this disclosure belongs. It will be further understood that terms should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In an embodiment, an electrically conductive thin film includes a compound represented by Chemical Formula 1 and having a layered crystal structure:

$$A_xM_yCh_z \qquad \text{Chemical Formula 1}$$

wherein A is V, Nb, or Ta, M is Ni, Co, Fe, Pd, Pt, Ir, Rh, Si, or Ge, Ch is S, Se, or Te, x is a number from 1 to 3, y is a number from 1 to 3, and z is a number from 2 to 14. In an embodiment x is a number from 1 to 2, y is a number from 1 to 2, and z is a number from 2 to 12. In another embodiment z is 3 to 10.

The compound represented by Chemical Formula 1 may comprise a compound represented by any of Chemical Formulas 2 to 10:

$$AMTe_z \qquad \text{Chemical Formula 2}$$

wherein A is V, Nb, or Ta, M is Ni, Co, Fe, Pd, Pt, Ir, Rh, Si, or Ge, and z is 2 or 5;

$$A_3MTe_6 \qquad \text{Chemical Formula 3}$$

wherein A is V, Nb, or Ta, and M is Si or Ge;

$$A_2MTe_4 \qquad \text{Chemical Formula 4}$$

wherein A is V, Nb, or Ta, and M is Si or Ge;

$$AMTe_4 \qquad \text{Chemical Formula 5}$$

wherein A is V, Nb, or Ta, and B is Pd, Pt, Ir, Rh, or Ir;

$$AB_2Te_2 \qquad \text{Chemical Formula 6}$$

wherein A is V, Nb, or Ta, and M is Ni, Co, or Fe;

$$A_3M_3Te_{14} \qquad \text{Chemical Formula 7}$$

wherein A is V, Nb, or Ta, and M is Ni, Co, Fe, Pd, Pt, Ir, or Rh;

$$AM_xTe_3 \qquad \text{Chemical Formula 8}$$

wherein A is V, Nb, or Ta, M is Ni, Co, Fe, Pd, Pt, Ir, or Rh, and x is 1 or 2; or $$A_2M_3Te_5 \qquad \text{Chemical Formula 9}$$

wherein A is V, Nb, or Ta, and M is Ni, Co, Fe, Pd, Pt, Ir, or Rh; and $$A_2MCh_z \qquad \text{Chemical Formula 10}$$

wherein A is V, Nb, or Ta, M is Ni, Co, Fe, Pd, Pt, Ir, or Rh, Ch is S or Se, and z is 5 or 6.

The compound may include $NbPdTe_5$, $NbNiTe_5$, $TaPtTe_5$, $TaNiTe_5$, $NbCoTe_2$, $NbNiTe_2$, $NbFeTe_2$, $Nb_{0.89}Fe_{0.93}Te_2$, $Ta_{0.77}Fe_{0.90}Te_2$, $TaCoTe_2$, $TaNiTe_2$, $Nb_3SiTe_6$, $Nb_3GeTe_6$, $Ta_3SiTe_6$, $Nb_3Ge_{0.898}Te_6$, $Nb_2SiTe_4$, $Nb_2GeTe_4$, $TaRuTe_4$, $TaRhTe_4$, $TaIrTe_4$, $NbIrTe_4$, $TaCo_2Te_2$, $TaNi_2Te_2$, $Ta_3Pd_3Te_{14}$, $TaFeTe_3$, $TaNi_2Te_3$, $Ta_2Pd_3Te_5$, $Ta_2PdS_6$, $Ta_2PdSe_6$, $Ta_2NiSe_6$, $Ta_2NiS_6$, $Nb_2PdSe_6$, $Nb_2PdS_6$, or a combination thereof. In an embodiment, the electrically conductive thin film may include a monocrystalline compound or a polycrystalline compound.

Most metal chalcogenides have a conductivity of a semiconductor and are opaque materials, but as will be set forth below, the aforementioned ternary chalcogenide compounds have layered crystal structure and thus may be prepared in the form of a thin film having a high level of conductivity and relatively high light transmittance. For example, an electrically conductive thin film including the aforementioned ternary chalcogenide compounds may have an electrical conductivity of greater than or equal to about 1000 Siemens per centimeter (S/cm), for example, greater than or equal to about 2000 S/cm, greater than or equal to about 5000 S/cm, greater than or equal to about 6000 S/cm, or even greater than or equal to about 9000 S/cm, or 1,000 S/cm to 20,000 S/cm, or 2000 S/cm to 18,000 S/cm, or 4,000 S/cm to 17,000 S/cm. The electrically conductive thin film may provide improved conductivity in comparison with an indium tin oxide (ITO) electrode that may provide electrical conductivity of about 5000 S/cm.

In addition to the high electrical conductivity, the electrically conductive thin film may exhibit light transmittance of greater than or equal to about 80 percent (%), greater than or equal to about 85%, or greater than or equal to about 90%, or a light transmittance of about 80% to about 99%, or about 85% to about 95%, at a thickness of 50 nm or less. Therefore, the electrically conductive thin film including the compound of Chemical Formula 1 may find its application in many fields (e.g., transparent electrodes) that benefit from high conductivity and high transparency at the same time.

Various efforts have been made to develop a flexible transparent electrode material having high electrical conductivity and being transparent in the visible range. Metals may have high electron density and high electrical conductivity. However, most metals tend to react with oxygen in air to form an oxide on its surface and thus show greatly reduced electrical conductivity. In addition, there was an attempt to reduce surface contact resistance using a ceramic material having good conductivity and showing reduced surface oxidation. However, the currently available conductive ceramic materials (such as ITO) have difficulties of an unstable supply of raw materials. Moreover, they may hardly achieve electrical conductivity comparable to that of a metal and their flexibility tends to be poor.

By contrast, the electrically conductive film including the compound of Chemical Formula 1 (e.g., the ternary chalcogenide compounds represented by any of Chemical Formulas 2 to 10) may show high conductivity comparable to that of metals and high transparency at the same time. In other words, the electrically conductive thin film includes an inorganic material including a metal and a non-metal element, and may provide a very high level of conductivity even at a small thickness. Without wishing to be bound by any theory, the disclosed electrically conductive thin film comprises two-dimensionally confined electrons capable of moving with high mobility even within a thin film, and thus may show high transparency together with a very high level of conductivity.

In some embodiments, the aforementioned ternary chalcogenide compounds included in the electrically conductive thin film may have a product of an absorption coefficient ($\alpha$) for light having a wavelength of 550 nm at 25° C. and a resistivity value ($\rho$) thereof of less than or equal to about 200 ohms per square ($\Omega/\square$), for example, less than or equal to about $20\Omega/\square$. The absorption coefficient and the resistivity may be obtained from a computer simulation, respectively. The resistivity ($\rho$) can be obtained by calculating the density of state (DOS) and the band structure around the Fermi level from the crystal structure of the corresponding rare earth element chalcogenide compounds. In addition, the absorption coefficient ($\alpha$) for a certain wavelength can be calculated from the dielectric constant of the compound that is obtained by applying the Drude model and considering electron transition due to interband transition. As to simulation methodology for providing the absorption coefficient ($\alpha$) and the resistivity ($\rho$), it is possible to further refer to the Vienna Ab-initio Simulation Package (written by Georg Kresse and Jurgen Furthmuller, Institut fur Materialphysik, Universitat Wien, Sensengasse 8, A-1130 Wien, Austria, Aug. 24, 2005, http://cms.mpi.univie.ac.at/VASP/), which is incorporated herein by reference in its entirety. The aforementioned simulation procedures can be summarized as in Table 1.

TABLE 1

| Calculation | Simulation level | Calculation/simulation |
|---|---|---|
| Atom electron structure | DFT | Structure optimization<br>Band structure calculation |
| Conductive characteristic | Semi-classical Boltzmann transport (const. $\tau$) | Intraband transition<br>$\sigma \approx (e^2/4\pi^3) \tau \int dk \, v(k) \, v(k) \, (-\partial f/\partial \epsilon) = ne^2\tau/m_{eff} = ne \, \mu$<br>$\rho = 1/\sigma$ |
| Dielectric characteristic | DFPT + Drude model | Interband transition<br>$\epsilon(\omega) = \epsilon_D(\omega) + \epsilon_B(\omega) = \epsilon_1(\omega) + i\epsilon_2(\omega)$ |
| Optical characteristic Calculate $\rho$ $\alpha$ | Ray optics | $n(\omega) + i \, k(\omega) = \epsilon(\omega)^{1/2}$<br>Absorption coeff. $\alpha = 4\pi k/\lambda$ |

DFT: density-functional theory
DFPT: density-functional perturbation theory
Drude model: free electron model for a solid
$\sigma$, $\tau$, $m_{eff}$, $\mu$, $\rho$: electrical conductivity, relaxation time, effective mass, mobility, resistivity
$\omega_p$ ($\omega_p'$): (screened) plasma frequency Hereinbelow, the description of Table 1 is explained in further detail.

In order to calculate a quantum mechanical state of a material, the first-principles calculation (a calculation made from a fundamental equation without using extrinsic parameters) based on the density-functional-theory (DFT) method (a method of solving a quantum mechanical equation by describing the electron distribution using an electron density function instead of a wave function) is performed to calculate the quantum mechanical state of an electron. The VASP (the Vienna Ab initio simulation package code, which is the first principle DFT code) is used to calculate the electron state. A candidate material group including a two-dimensional electron gas layer is selected from the Inorganic Crystal Structure Database (ICSD). The atomic structure information for the candidate material is input and the energy level of the electrons is calculated by simulation, and for such electrons, an energy density function and a state density function on a k-space of the electrons are calculated.

The electron structure calculated through the DFT computer simulation provides an E-k diagram (the band structure) and DOS (Density of State: electron state density, electron state density function per energy unit) information, making it possible to determine whether the given material is a metallic conductive material ($DOS(E_F) > 0$) or a semiconductor material ($DOS(E_F) = 0$) depending on the presence of the DOS on the maximum energy level ($E_F$) available to the electrons.

In order to predict the conductivity ($\sigma$) of a metallically conducting material, its conductive characteristics are estimated by introducing a semi-classical Boltzmann transport model. In this case, relaxation time of electrons ($\tau$: duration during which an electron can move without collision) is assumed to be constant (see Neil W. Ashcroft and N. David Mermin, Solid-State Physics, Holt, Rinehart and Winston, 1976, which is incorporated herein by reference in its entirety).

Boltzmann-Transport $$\sigma = (e^2/4\pi^3)\tau \int dK v(k) v(k)(-\partial f/\partial E)$$

Herein, $\tau$ is a relaxation time of an electron, k is a state of the electron in the k-space, v(k) is a speed of the electron in the k state, f is the Fermi-Dirac distribution function, and E is energy. In this case, v(k) may be calculated from the E-k diagram, and $\sigma/\tau$ may be obtained from the above formula.

The mechanism determining the transmittance or the absorption of the conductive material may include intraband absorption due to plasma-like oscillation of free electrons and intrerband absorption due to band-to-band transition of bound electrons. The quantum computational simulation process considering each of the mechanisms may be obtained by the process as set forth in Table 2 entitled "Simulation Table for Optical Properties" (see Ashcroft and Mermin, Solid State Physics).

TABLE 2

| STEP | Category | Calculation | Results | Method (tool) |
|---|---|---|---|---|
| 1 | Optical simulation | Interband transition | $\epsilon B(w) = \epsilon B1(w) + i \epsilon B2(w)$ | DFT (VASP) |
| 2 | Optical simulation | Plasma frequency intraband transition | $\epsilon D(w) = \epsilon D1(w) + i \epsilon D2(w)$ | Boltzmann transport DFT (VASP) or post-processing |
| 3 | Optical simulation | Total dielectric constant refractive index | | Post-processing |
| 4 | Optical simulation | Reflectance absorption coefficient | Plasma freq. reflectance absorption co. transmittance | Post-processing |

Herein, B denotes a band and D denotes a Drude model.

In this case, the relationships of the dielectric constant ($\in$), the refractive index (n), and the absorption coefficient ($\alpha$) of a solid are shown as follows. For the dielectric constant, both the interband transition related portion ($\in_{(Band)}$) and the intraband transition related portion ($\in_{(Drude)}$) should be considered.

$$\in(\omega) = \in_{(Drude)} + \in_{(Band)}$$

$$= \in_1(\omega) + i\in_2(\omega) \text{ dielectric function}$$

$$(n+ik)^2 = \in(\omega) \text{ refraction function}$$

$$\alpha(\omega) = 4\pi k/\lambda \text{ absorption coefficient}$$

As set forth in the above conductivity calculation, the interband absorption may be calculated through the band structure calculated in advance, while the intraband absorption by the free electrons is calculated by the simulation as below through the conductivity and optical coefficient calculation based on the Drude modeling (see Jinwoong Kim, Journal of Applied Physics 110, 083501 (2011), which is incorporated herein by reference in its entirety).

CGS UNIT $$\sigma(\omega) = \sigma_0/[1 - i\omega\tau] \text{ AC conductivity}$$

$$\sigma_0 = ne^2\tau/m \text{ DC conductivity}$$

$$\varepsilon(\omega) = 1 + i(4\pi/\omega) \sigma(\omega)$$

-continued $$\omega_p^2 \tau = \sigma_0/\varepsilon_0 \quad (si)$$

$$= 4\pi \, \sigma_0 \quad (cgs)$$

$$\varepsilon(\omega) = 1 + i(4\pi/\omega) \, \sigma_0/[1 - i\omega\tau] = 1 - (4\pi \, \sigma_0/\omega)/[i + \omega\tau]$$

$$= 1 - (4\pi \, \sigma_0/\omega)(*i+\omega\tau)/[1+(\omega\tau)^2]$$

$$= 1 - (\omega_p \tau)^2/[1 + (\omega\tau)^2] +$$

$$i(\omega_p \tau)^2/[\omega\tau(1 + (\omega\tau)^2)]$$

$$\epsilon_1 = 1 - \frac{\omega_p^2 \tau^2}{1 + \omega^2 \tau^2}$$

$$\epsilon_2 = \frac{\omega_p^2 \tau^2}{\tau\omega(1 + \omega^2 \tau^2)}$$

$$n = \frac{1}{\sqrt{2}} \left( \epsilon_1 + (\epsilon_1^2 + \epsilon_2^2)^{1/2} \right)^{1/2}$$

$$\kappa = \frac{1}{\sqrt{2}} \left( -\epsilon_1 + (\epsilon_1^2 + \epsilon_2^2)^{1/2} \right)^{1/2}$$

ω: frequency $\omega_p$: plasma frequency k: extinction coefficient

As such, the calculation of the interband absorption and the intraband absorption makes it possible to calculate the dielectric function of the given material, and the optical constants thereof can be simulated therefrom. In the end, the reflectance (R), the absorption coefficient (a), and the transmittance (T) of the given material can be calculated therefrom.

In accordance with the foregoing method, the product of the absorption coefficient (α) and the resistivity (ρ) for various metal dichalcogenides is compiled in Table 3.

TABLE 3

| Composition | ρ (Ω cm) | α (cm⁻¹) | Rs = C α ρ (Ω/□) at transmittance >0.90 | ρ · α |
|---|---|---|---|---|
| Ta1Ni1Te5 | $3.19 \times 10^{-5}$ | 529174 | $1.60 \times 10^2$ | 16.88 |
| Ta1Pt1Te5 | $2.90 \times 10^{-5}$ | 597065 | $1.64 \times 10^2$ | 17.31 |
| Nb1Pd1Te5 | $3.17 \times 10^{-5}$ | 588429 | $1.77 \times 10^2$ | 18.65 |
| Nb1Ni1Te5 | $3.26 \times 10^{-5}$ | 572296 | $1.77 \times 10^2$ | 18.66 |
| Ta2PdS6 | $7.46 \times 10^{-5}$ | 262462 | $1.86 \times 10^2$ | 19.58 |
| Ta2PdSe6 | $6.05 \times 10^{-5}$ | 357873 | $2.06 \times 10^2$ | 21.65 |
| Ta1Ni2Te2 | $4.30 \times 10^{-5}$ | 578550 | $2.36 \times 10^2$ | 24.88 |
| Ta1Ni2Te3 | $6.13 \times 10^{-5}$ | 515055 | $3.00 \times 10^2$ | 31.57 |
| Ta1Ru1Te4 | $6.87 \times 10^{-5}$ | 484356 | $3.16 \times 10^2$ | 33.28 |
| Ta1Ni1Te2 | $7.95 \times 10^{-5}$ | 501351 | $3.78 \times 10^2$ | 39.86 |
| Ta1Fe1Te3 | $7.80 \times 10^{-5}$ | 559154 | $4.14 \times 10^2$ | 43.61 |
| Ta3Pd3Te14 | $7.92 \times 10^{-5}$ | 599271 | $4.50 \times 10^2$ | 47.46 |
| Nb1Ni1Te2 | $9.44 \times 10^{-5}$ | 574674 | $5.15 \times 10^2$ | 54.25 |
| Ta0.77Fe0.90Te2 | $1.03 \times 10^{-4}$ | 575848 | $5.63 \times 10^2$ | 59.31 |
| Nb0.89Fe0.93Te2 | $9.90 \times 10^{-5}$ | 617920 | $5.81 \times 10^2$ | 61.17 |
| Nb1Fe1Te2 | $1.01 \times 10^{-4}$ | 617407 | $5.90 \times 10^2$ | 62.36 |
| Ta2NiSe5 | $1.71 \times 10^{-4}$ | 420448 | $6.83 \times 10^2$ | 71.90 |
| Nb1Co1Te2 | $1.18 \times 10^{-4}$ | 631830 | $7.09 \times 10^2$ | 74.56 |
| Ta1Co2Te2 | $1.18 \times 10^{-4}$ | 636484 | $7.16 \times 10^2$ | 75.11 |
| Ta1Ir1Te4 | $1.78 \times 10^{-4}$ | 501425 | $8.46 \times 10^2$ | 89.25 |
| Ta2Pd3Te5 | $2.72 \times 10^{-4}$ | 360248 | $9.29 \times 10^2$ | 97.99 |
| Nb1Ir1Te4 | $1.94 \times 10^{-4}$ | 573882 | $1.06 \times 10^3$ | 111.33 |
| Ta1Rh1Te4 | $1.93 \times 10^{-4}$ | 582941 | $1.07 \times 10^3$ | 112.51 |
| Ta2NiS5 | $2.75 \times 10^{-4}$ | 413337 | $1.08 \times 10^3$ | 113.67 |
| Ta1Co1Te2 | $2.16 \times 10^{-4}$ | 556058 | $1.14 \times 10^3$ | 120.11 |
| Ta3Si1Te6 | $2.86 \times 10^{-4}$ | 477068 | $1.29 \times 10^3$ | 136.44 |
| Nb3Ge1Te6 | $3.00 \times 10^{-4}$ | 537218 | $1.53 \times 10^3$ | 161.17 |
| Nb3Ge0.898Te6 | $2.97 \times 10^{-4}$ | 562643 | $1.59 \times 10^3$ | 167.10 |
| Nb3Si1Te6 | $3.44 \times 10^{-4}$ | 531015 | $1.73 \times 10^3$ | 182.67 |

TABLE 4

| Composition | σ (S/cm) | ρ(Ω cm) | α (1/cm) | Rs = C α ρ (Ω/□) at transmittance >0.90 | ρ · α |
|---|---|---|---|---|---|
| Ta2PdS6 | $1.34 \times 10^4$ | $7.46 \times 10^{-5}$ | 262462 | $1.86 \times 10^2$ | 19.58 |
| Ta2PdSe6 | $1.65 \times 10^4$ | $6.05 \times 10^{-5}$ | 357873 | $2.06 \times 10^2$ | 21.65 |
| Ta2NiSe6 | $2.71 \times 10^4$ | $3.69 \times 10^{-5}$ | 246433 | $8.63 \times 10^1$ | 9.09 |
| Ta2NiS6 | $2.50 \times 10^4$ | $4.00 \times 10^{-5}$ | 274295 | $1.04 \times 10^2$ | 10.97 |
| Nb2PdSe6 | $1.55 \times 10^4$ | $6.47 \times 10^{-5}$ | 420512 | $2.58 \times 10^2$ | 27.21 |
| Nb2PdS6 | $1.21 \times 10^4$ | $8.25 \times 10^{-5}$ | 422350 | $3.31 \times 10^2$ | 34.84 |

In Table 3 and Table 4, the product of resistivity (ρ) and the absorption coefficient (α) may represent the product of sheet resistance ($R_s$) and transmittance (−ln T) according to the equation. Accordingly, the compound having a lower value of ρ*α may be advantageous for a material of the electrically conductive thin film.

$$e^{-\alpha t} = T \text{ (i.e., } \alpha t = -\ln T\text{)}$$

$$R_s = \rho/t$$

$$\therefore \rho^* \alpha = R_s^*(-\ln T)$$

α: absorption coefficient

ρ: resistivity

T: transmittance (at λ=550 nm)

t: thickness

Rs: sheet resistance

The ternary chalcogenide compound represented by Chemical Formula 1 has a layered crystal structure including a repeating unit structure layer. In each of unit structure layer, the upper and lower surfaces are enveloped with chalcogen elements (e.g., Te, Se, or S) and the metal or metalloid fills therebetween. In such a unit structure layer, high density of electrons ($10^{21}$/cm³ or higher) are confined within a regular and two-dimensional crystal structure and thus the resulting material may show a high level of electrical conductivity (e.g., higher than $10^3$ S/cm). The ternary chalcogenide compound may be a two-dimensional layered material having a sheet-like shape, and the unit structure layers are linked with each other via van der Waals force. As such, the compounds may show a very low level of interlayer binding energy (for example, less than or equal to about 0.008 eV/Å²) as measured by the Vienna Ab-initio Simulation Package (VASP). Therefore, the compound may show interlayer sliding phenomenon of the unit structure layers and thus may be prepared as nanosheets (i.e., nanoflakes) via mechanical exfoliation or liquid phase exfoliation. The nanoflakes thus prepared may form a coating on a transparent film to provide a thin film thereof, and such a thin film may show high transparency, may be flexible, and may have high electrical conductivity. Therefore, the electrically conductive thin film including the ternary chalcogenide may show enhanced flexibility in comparison with a conventional ceramic conductive thin film and thus may be used in next generation electronic devices such as a flexible electronic device.

The layered crystal structure of the ternary chalcogenide compound represented by any of Chemical Formulae 2 to 10 may belong to a orthorhombic system with a Cmcm(63) space group, an orthorhombic system with a Pnma(62) space group, an orthorhombic system with a Cmca (64) space group, an orthorhombic system with a Pma2(28) space group, an orthorhombic system with a Pmna(53) space group, a monoclinic system with a P21/c(14) space group, a monoclinic system with an I12/m1(12) space group, a monoclinic system with a C12/m1(12) space group, or a monoclinic system with a C12/c1(15) space group. The crystal systems and their space groups may be summarized as shown in Table 5 and Table 6.

TABLE 5

| Composition group | Layered ternary chalcogenide composition | Space group | Space group number |
|---|---|---|---|
| Chemical Formula 2 ($z = 5$) | Nb1Pd1Te5 | Pnma | 62 |
| | Nb1Ni1Te5 | Cmcm | 63 |
| | Ta1Pt1Te5 | Cmcm | 63 |
| | Ta1Ni1Te5 | Cmcm | 63 |
| Chemical Formula 2 ($z = 7$) | NbCoTe2 | Cmca | 64 |
| | NbNiTe2 | Pma2 | 28 |
| | NbFeTe2 | Pmna | 53 |
| | TaCoTe2 | $P2_1/c$ | 14 |
| | TaNiTe2 | Pmna | 53 |
| | Nb0.89Fe0.93Te2 | Pmna | 53 |
| | Ta0.77Fe0.90Te2 | Pmna | 53 |
| Chemical Formula 3 | Nb3Si1Te6 | Pnma | 62 |
| | Nb3Ge1Te6 | Pnma | 62 |
| | Ta3Si1Te6 | Pnma | 62 |
| | Nb3Ge0.898Te6 | Pnma | 62 |
| Chemical Formula 4 | Nb2Si1Te4 | $P2_1/c$ | 14 |
| | Nb2Ge1Te4 | $P2_1/c$ | 14 |
| Chemical Formula 5 | Ta1Ru1Te4 | $Pmn2_1$ | 31 |
| | Ta1Rh1Te4 | $Pmn2_1$ | 31 |
| | Ta1Ir1Te4 | $Pmn2_1$ | 31 |
| | Nb1Ir1Te4 | $Pmn2_1$ | 31 |
| Chemical Formula 6 | Ta1Co2Te2 | Pnma | 62 |
| | Ta1Ni2Te2 | Pnma | 62 |
| Chemical Formula 7 | Ta3Pd3Te14 | $P2_1/m$ | 11 |
| Chemical Formula 8 ($x = 1$) | Ta1Fe1Te3 | $P2_1/m$ | 11 |
| Chemical Formula 8 ($x = 2$) | Ta1Ni2Te3 | $P2_1/m$ | 11 |
| Chemical Formula 9 | Ta2Pd3Te5 | Pnma | 62 |

TABLE 6

| Composition | Layered ternary chalcogenide composition | Space group | Space group number | Crystal structure |
|---|---|---|---|---|
| Chemical Formula 10 ($z = 6$) | Ta2PdS6 | C2/m | 12 | monoclinic |
| | Ta2PdSe6 | C2/m | 12 | monoclinic |
| | Nb2PdS6 | C2/m | 12 | monoclinic |
| | Nb2PdSe6 | C2/m | 12 | monoclinic |
| Chemical Formula 10 ($z = 5$) | Ta2NiS5 | Cmcm | 63 | orthorhombic |
| | Ta2NiSe5 | C2/c | 15 | monoclinic |

Figure 1:
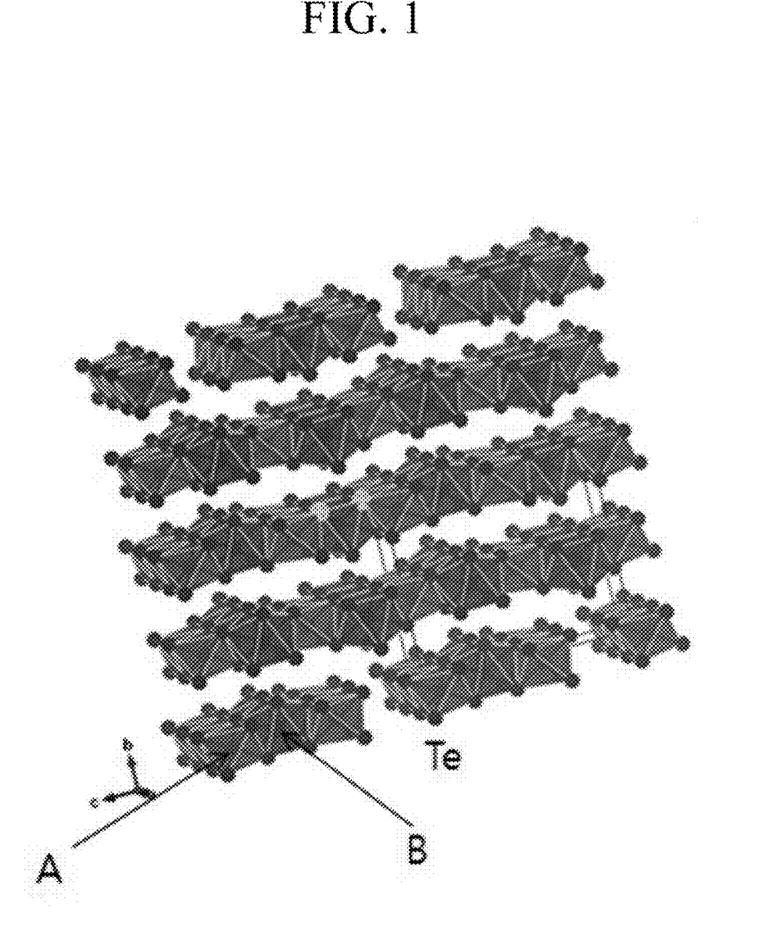
FIG. 1 is a view schematically illustrating an embodiment of a crystal structure of a ternary telluride represented by Chemical Formula 2 wherein z is 5.
Figure 2:
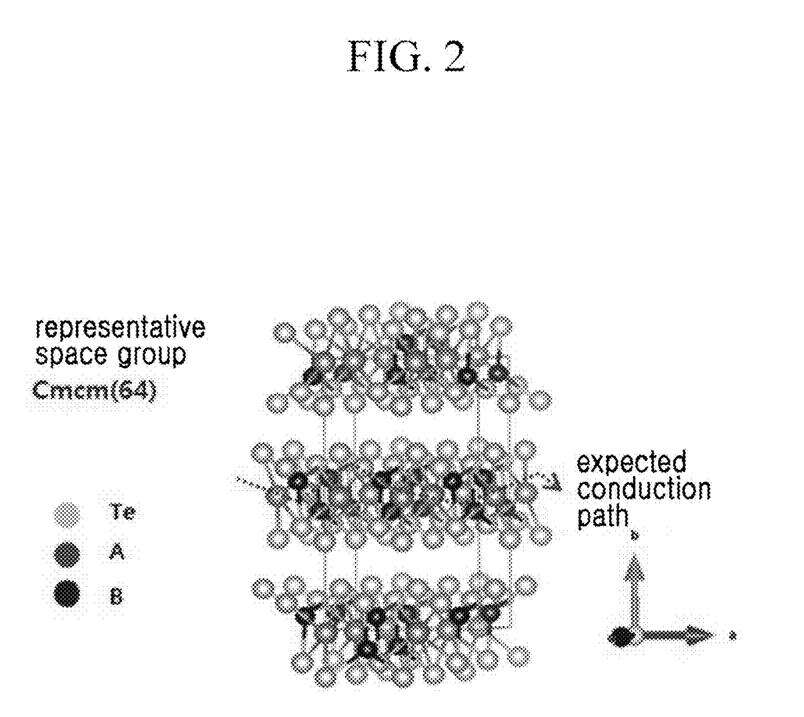
FIG. 2 is a view schematically illustrating an embodiment of a crystal structure of a ternary telluride represented by Chemical Formula 2 wherein z is 2.

The crystal structures of the compound represented by Chemical Formula 2 are schematically illustrated in FIG. 1 and FIG. 2. Referring to FIG. 1, in the unit structure layer of the compound of Chemical Formula 2 (wherein z is 5), the interlayer Te—Te distance is short (e.g., less than or equal to 3.9 angstroms) and the electrical conduction may be accomplished through the Te—Te layers. In addition, the interaction between the layers may be decreased and thus the conductivity may further increase. Referring to FIG. 2, in the compound of Chemical Formula 2 (wherein z is 2), the electrical conduction may be carried out through a zigzag path between two metal elements A and B (i.e., the A atom-the B atom-the A atom). Therefore, the conducting path may be controlled by changing the metal element. As such, in comparison with a two-component chalcogenide, the ternary chalcogenide may control its properties more easily because in the ternary chalcogenide, the binding between the atoms and/or may be finely tuned.

According to an embodiment, the electrically conductive thin film may be produced by preparing a raw material of the ternary chalcogenide represented by Chemical Formula 1, a polycrystalline or monocrystalline bulk material prepared from the same, or a powder obtained from the bulk material, and conducting a proper method such as vapor deposition and the like with the raw material, the prepared bulk material, or a powder thereof to form a conductive thin film (e.g., a transparent conductive layer). Alternatively, the electrically conductive thin film may be obtained by liquid phase exfoliation (LPE) of the bulk material powder to provide nanosheets and forming the obtained nanosheets into a thin film.

The raw material of the ternary chalcogenide compound may include each element and a compound including the each element. For example, the raw material may include V, Nb, or Ta for metal A, and Ni, Co, Fe, Pd, Pt, Ir, Rh, Si, or Ge for metal B. For example, the raw material may include sulfur, selenium, or tellurium. For example, the raw material may include a compound including at least one of the above metals and sulfur, selenium, and tellurium.

The polycrystalline bulk material may be prepared from the above raw material (e.g., a mixture of a metal powder and a tellurium or selenium powder at a ratio of 1:2) according to a quartz ampoule method, an arc melting method, a solid-state reaction method, and the like. For example, the quartz ampoule method includes introducing the raw material into a quartz tube or an ampoule made of a metal, sealing the same under vacuum, and heating the same to perform a solid-phase reaction or a melting process. The arc melting method includes introducing a raw material element into a chamber, performing an arc discharge process under an inert gas (e.g., nitrogen, argon, etc.) atmosphere to melt the raw material element, and solidifying the same. The solid-state reaction method may include mixing and optionally pelletizing the raw material powder, heat-treating and optionally pelletizing an obtained mixture or an obtained pellet, and sintering the same.

The obtained polycrystalline bulk material may be subjected to a sintering process to be prepared as a highly densified product. The highly densified product may be used as a specimen for measuring electrical conductivity. Such a densification process may be performed by a hot pressing method, a spark plasma sintering method, a hot forging method, or the like. The hot pressing method includes loading the pulverized compound into a mold having a predetermined shape, and forming the same at a high temperature of, for example, about 300° C. to about 800° C. under a high pressure of, for example, about 30 Pa to about 300 MPa. The spark plasma sintering method includes applying the pulverized compound with high voltage current under a high pressure, for example, with a current of about 50 A to about 500 A under a pressure of about 30 MPa to about 300 MPa to sinter the material within a short period of time. The hot forging method may include compressing and sintering the powder compound at a high temperature of, for example, about 300° C. to about 700° C.

The bulk sintered body thus prepared may be subjected to post-processing for homogenization. For example, the bulk sintered body thus prepared may show local phase segregation or inhomogeneity occurring due to the density difference between the elements in its synthesis during its melting or cooling process. In order to relieve the phase segregation or inhomogeneity, the polycrystalline sintered body first synthesized via the heat treatment (e.g., the polycrystalline ingot) is pulverized and the powder thus prepared is packed and placed into a quartz tube, vacuum-sealed, and subjected to a re-heating or annealing process to produce a polycrystalline sintered body having enhanced homogeneity.

The monocrystalline material may be obtained by preparation of a crystal ingot or growth of a monocrystal. The crystal ingot may be obtained by heating a congruent melting material to a temperature higher than the melting point of the material and then slowly cooling the same. For example, the raw material mixture is introduced into a quartz ampoule, is melted after sealing the ampoule under vacuum, and then the melted mixture is slowly cooled to provide a crystal ingot. The crystal grain size may be controlled by adjusting the cooling speed of the melted mixture. The growth of the monocrystal may be performed by a metal flux method, a Bridgman method, an optical floating zone method, a vapor transport method, or the like. In the metal flux method, a raw material mixture is put into a crucible and treated at a high temperature to grow a crystal under an atmosphere wherein the raw material elements may form a growing crystal at a high temperature. In the metal flux method, the raw material powder is melted in a crucible together with additional flux at a high temperature and slowly cooled so as to grow crystals at a certain temperature. The Bridgman method includes introducing the raw material element into a crucible and heating the same at a high temperature until the raw material element is dissolved at the terminal end of the crucible, and then slowly moving the high temperature zone and locally dissolving the sample to pass the entire sample through the high temperature zone, so as to grow a crystal. The optical floating zone method is a method including forming a raw material element into a rod-shaped seed rod and a feed rod, locally melting the sample at a high temperature by focusing lamp light on the feed rod, and slowly pulling up the melted part to grow a crystal. The vapor transport method includes introducing the raw material element into the bottom part of a quartz tube and heating the raw material element, and maintaining the upper part of quartz tube at a low temperature to perform a solid-phase reaction with a vaporized raw material element at a low temperature and thereby to grow a crystal. The electrical conductivity of the obtained monocrystal material may be measured according to a DC 4-terminal method.

The obtained polycrystal or monocrystal bulk material is pulverized to provide crystal powders. The pulverization may be performed by any methods such as with a ball mill without particular limitation. After the pulverization, the powder having a uniform size may be provided using, for example, a sieve.

The obtained polycrystal or monocrystal bulk material is used as a target of vapor deposition to provide a thin continuous film (i.e., electrically conductive thin film) including the compound. The vapor deposition may be performed by a physical vapor deposition method such as thermal evaporation and sputtering, chemical deposition (CVD), atomic layer deposition (ALD), or pulsed laser deposition. The deposition may be performed using any known or commercially available apparatus. The deposition conditions may vary with the types of the compound and the deposition method, but are not particularly limited.

According to another embodiment, the bulk material of the above compound or the powder thereof may be subjected to liquid phase exfoliation (LPE) to be prepared as a plurality of nanosheets, which are then brought into contact with each other so as to provide an electrical connection, providing an electrically conductive thin film.

In the liquid phase exfoliation, the bulk material or the powder thereof may be subjected to ultra-sonication in an appropriate solvent. Examples of the solvent suitable for the liquid phase exfoliation may include, but are not limited to, water, an alcohol (e.g., isopropyl alcohol, ethanol, or methanol), N-methyl pyrrolidone (NMP), hexane, benzene, dichlorobenzene, toluene, chloroform, diethylether, dichloromethane (DCM), tetrahydrofuran (THF), ethyl acetate (EtOAc), acetone, dimethyl formamide (DMF), acetonitrile (MeCN), dimethyl sulfoxide (DMSO), ethylene carbonate, propylene carbonate, γ-butyrolactone, γ-valerolactone, a perfluorinated aromatic solvent (e.g., hexafluorobenzene, octafluorotoluene, pentafluorobenzonitrile, and pentafluoropyridine), or a combination thereof.

The solvent may further include an additive such as a surfactant in order to facilitate the exfoliation and prevent the exfoliated nanosheets from being agglomerated. Examples of the surfactant may include sodium dodecyl sulfate (SDS) and sodium dodecylbenzenesulfonate (SDBS).

The ultrasonication may be performed by using any conventional or commercially available ultrasonication device, and the conditions thereof (e.g., ultrasonication time) are not particularly limited, but may be appropriately selected considering a solvent used and a powder concentration in the solvent. For example, the ultrasonication may be performed for greater than or equal to about 1 hour, for example, for about 1 hour to about 100 hours, but is not limited thereto. The powder concentration in the solvent may be greater than or equal to about 0.01 g/mL, for example, within a range from about 0.01 g/mL to about 1 g/L, but is not limited thereto.

In order to facilitate the exfoliation, lithium atoms may be intercalated into the compound having an interlayered crystal structure. According to an embodiment, the compound is immersed in an alky lithium compound (e.g., butyllithium) solution in an aliphatic hydrocarbon solvent such as hexane to intercalate lithium atoms into the compound, and the obtained product is subjected to ultrasonication to provide a plurality of nanosheets including the compound. For example, by putting the obtained product in water, water and the intercalated lithium ions may react to generate hydrogen between layers of the crystal structure, so as to accelerate the interlayer separation. The obtained nanosheets are separated according to an appropriate method (e.g., centrifugation) and washed.

In the electrically conductive thin film including the nanosheets (e.g., nanoflakes), the nanosheets physically contact one another to provide an electrical connection. The length of nanosheets is not particularly limited, but may be appropriately adjusted. For example, the nanosheet may have a length of less than or equal to about 500 μm, for example, of about 10 nm to about 10 μm, but is not limited thereto. The nanosheets may have a thickness of less than or equal to about 100 nm. The obtained film may have coverage of greater than or equal to about 20%, for example, of greater than or equal to about 50%. The obtained film may have high transmittance (e.g., greater than or equal to about 80%, or greater than or equal to about 85%) when the thickness is less than or equal to about 20 nm, for example, less than or equal to about 5 nm. The formation of the film using a nanosheet may be conducted in any known method. For example, the formation of the film may be performed by dip coating, spray coating, printing after forming an ink or a paste, and the like.

According to an embodiment, the manufactured nanosheets are added to deionized water, and the resultant dispersion is ultrasonicated again. An organic solvent that is not miscible with water (e.g., an aromatic hydrocarbon such as xylene or toluene) is added to the ultrasonicated dispersion. When the mixture thus obtained is shaken, a thin film including nanosheets is formed at the interface between the water and the organic solvent. When a clean, wetted, and oxygen plasma-treated glass substrate is slightly dipped to the interface and taken out, the thin film including nanosheets is spread out on the substrate at the interface. The thickness of the thin film may be adjusted by controlling a concentration of the nanosheets per area on the surface of the water/organic solvent and a speed/angle when the substrate is taken out.

The electrically conductive thin film shows high conductivity, enhanced light transmittance, and excellent flexibility, and thus may replace an electrode including a transparent conductive oxide such as ITO, ZnO, and the like and a transparent film including a Ag nanowire.

Another embodiment provides an electronic device including the above electrically conductive thin film. The electrically conductive thin film is the same as described above. The electronic device may include, for example, a flat panel display (e.g., LCD, LED, and OLED), a touch screen panel, a solar cell, an e-window, a heat mirror, a transparent transistor, or a flexible display, but is not limited thereto.

Figure 5:
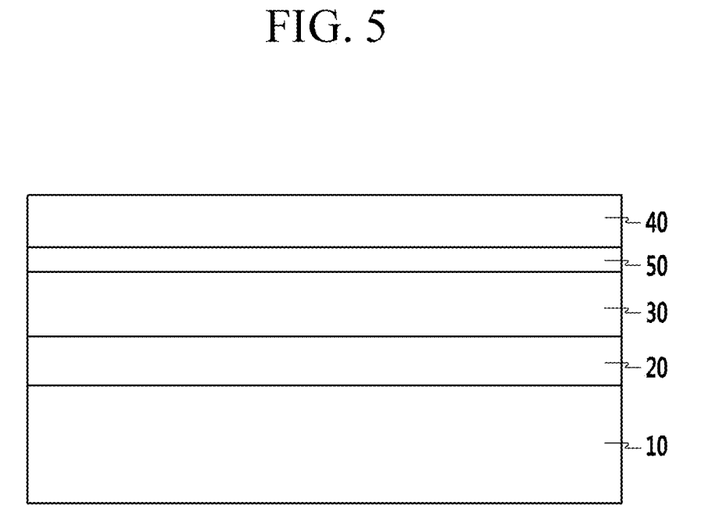
FIG. 5 is a cross-sectional view of an embodiment of an organic light emitting diode device including an electrically conductive thin film.

FIG. 5 is a cross-sectional view of an organic light emitting diode device including an electrically conductive thin film according to an embodiment.

An organic light emitting diode device according to an embodiment includes a substrate 10, a lower electrode 20, an upper electrode 40 facing the lower electrode 20, and an emission layer 30 interposed between the lower electrode 20 and the upper electrode 40.

The substrate 10 may be made of an inorganic material such as glass, or an organic material such as polycarbonate, polymethyl methacrylate, polyethylene terephthalate, polyethylene naphthalate, polyamide, polyethersulfone, or a combination thereof, or a silicon wafer.

One of the lower electrode 20 and the upper electrode 40 is a cathode and the other is an anode. For example, the lower electrode 20 may be an anode and the upper electrode 40 may be a cathode.

At least one of the lower electrode 20 and the upper electrode 40 may be a transparent electrode. When the lower electrode 20 is a transparent electrode, the organic light emitting diode device may have a bottom emission structure in which light is emitted toward the substrate 10, while when the upper electrode 40 is a transparent electrode, the organic light emitting diode device may have a top emission structure in which light is emitted away from the substrate 10. In addition, when the lower electrode 20 and upper electrode 40 are both transparent electrodes, light may be emitted toward the substrate 10 and away from the substrate 10.

The transparent electrode may be prepared from the above electrically conductive thin film. Details for the electrically conductive thin film are the same as set forth above. The electrically conductive thin film may show high electron density. The electrically conductive thin film may be used to replace the conventional LiF/Al or MgAg alloy.

The emission layer 30 may be made of an organic material inherently emitting one among three primary colors such as red, green, blue, and the like, or a mixture of an inorganic material with the organic material, for example, a polyfluorene derivative, a (poly)paraphenylene vinylene derivative, a polyphenylene derivative, a polyvinylcarbazole or its derivative, a polythiophene derivative, or a compound prepared by doping these polymer materials with a perylene-based pigment, a coumarin-based pigment, a rhodamine-based pigment, rubrene, perylene, 9,10-diphenylanthracene, tetraphenyl butadiene, Nile red, coumarin, quinacridone, and the like. An organic light emitting device displays a desirable image by a spatial combination of primary colors emitted by an emission layer therein.

The emission layer 30 may emit white light by combining basic colors such as three primary colors of red, green, and blue, and in this case, the color combination may emit white light by combining the colors of adjacent pixels or by combining colors laminated in a perpendicular direction.

An auxiliary layer 50 may be positioned between the emission layer 30 and the upper electrode 40 to improve luminous efficiency of the emission layer 30. In the drawing, the auxiliary layer 50 is shown only between the emission layer 30 and the upper electrode 40, but it is not limited thereto. The auxiliary layer 50 may be positioned between the emission layer 30 and the lower electrode 20, or between the emission layer 30 and the upper electrode 40 and between the emission layer 30 and the lower electrode 20.

The auxiliary layer 50 may include an electron transport layer (ETL) and a hole transport layer (HTL) for balancing between electrons and holes, an electron injection layer (EIL), a hole injection layer (HIL) for reinforcing injection of electrons and holes, and the like. It may include one or more layers selected therefrom.

Figure 6:
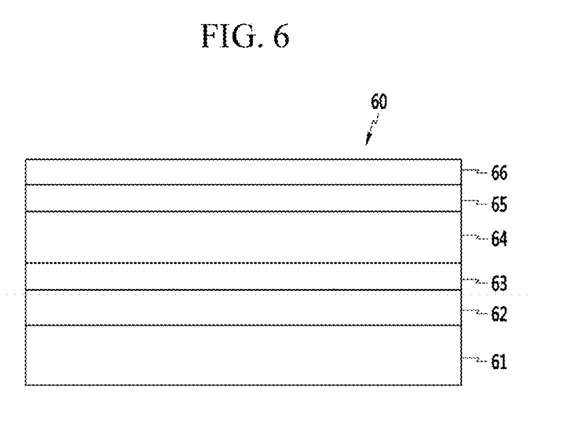
FIG. 6 is a cross-sectional view of an embodiment of a touch screen panel including an embodiment of the electrically conductive thin film.

In an embodiment, the electronic device may be a touch screen panel (TSP). Detailed structure of the TSP is known in the art. A schematically illustrated structure of the TSP is shown in FIG. 6. Referring to FIG. 6, the TSP 60 may include on a display panel 61, a first transparent conductive film 62, a first transparent adhesive layer 63 (e.g., an optically clear adhesive film), a second transparent conductive film 64, a second transparent adhesive layer 65, and a window 66 for a display device. The first transparent conductive film and/or the second transparent conductive film may be the aforementioned electrically conductive film.

The examples of applying the electrically conductive thin film to an organic light emitting diode device or a touch screen panel are illustrated above, but the electrically conductive thin film may be used as an electrode for all electronic devices including a transparent electrode without a particular limit, for example, a pixel electrode and/or a common electrode for a liquid crystal display (LCD), an anode and/or a cathode for an organic light emitting diode device, and a display electrode for a plasma display device.

Hereinafter, the embodiments are illustrated in more detail with reference to examples. These examples, however, are not in any sense to be interpreted as limiting the scope of this disclosure.

EXAMPLES

Example 1: Preparation of NbPdTe$_5$ Polycrystalline Sintered Body

In a glove box, a niobium (Nb) powder (purity: 99.9%, manufacturer: Heraeus Co., Ltd.), a palladium (Pd) powder (purity: 99.9%, manufacturer: Heraeus Co., Ltd.), and tellurium (purity: 99.99%, manufacturer: 5N Plus Co., Ltd.) are mixed at a mole ratio of 1:1:5 to provide a mixture. The prepared mixture is introduced into a quartz glass tube, and the tube is sealed under a vacuum condition. The quartz glass tube is introduced into a box furnace and heated at a heating rate of 100° C./h to 1200° C., and is maintained at the same temperature for 24 hours and is slowly cooled at a rate of 2° C./h to room temperature to obtain a NbPdTe$_5$ polycrystalline sintered body.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 2: Preparation of NbNiTe$_5$ Polycrystalline Sintered Body

A NbNiTe$_5$ polycrystalline sintered body is prepared in the same manner set forth in Example 1, except that in a glove box, a niobium (Nb) powder (purity: 99.9%, manufacturer: Heraeus Co., Ltd.), a nickel (Ni) powder (purity: 99.9%, manufacturer: Sigma Aldrich Co., Ltd.), and tellurium (purity: 99.99%, manufacturer: 5N Plus Co., Ltd.) are mixed at a mole ratio of 1:1:5 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 3: Preparation of TaPtTe$_5$ Polycrystalline Sintered Body I

In a glove box, a tantalum (Ta) powder (purity: 99.5%, manufacturer: Sigma Aldrich Co., Ltd.), a platinum (Pt) powder (purity: 99.5%, manufacturer: Heraeus Co., Ltd.), and tellurium (purity: 99.99%, manufacturer: 5N Plus Co., Ltd.) are mixed at a mole ratio of 1:1:5 to provide a mixture. The prepared mixture is introduced into a quartz glass tube, and the tube is sealed under a vacuum condition. The quartz glass tube is introduced into a box furnace and heated at a heating rate of 100° C./h to 1100° C., and is maintained at the same temperature for 24 hours and is slowly cooled at a rate of 2° C./h to room temperature to obtain a TaPtTe$_5$ polycrystalline sintered body. The resulting product is heat-treated again for 48 hours at a temperature of 1000° C. to obtain a TaPtTe$_5$ polycrystalline sintered body. For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

Figure 3:
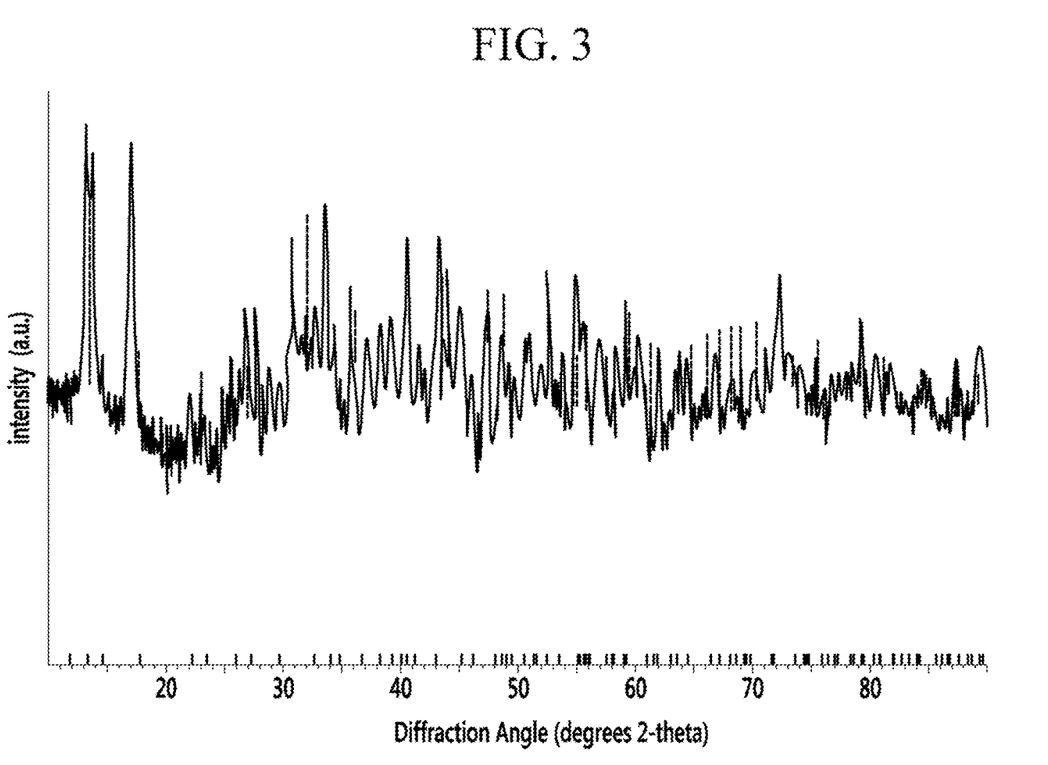
FIG. 3 is a graph of intensity (arbitrary units, a.u.) versus diffraction angle (Degrees 2-theta) which shows an X-ray diffraction spectrum of a TaPtTe$_5$ polycrystal sintered body prepared in Example 1.

For some of the sintered bodies thus prepared, X-ray diffraction analysis is performed to confirm its crystal structure and the results thereof are summarized in Table 7. The X-ray diffraction spectrum of the sintered body thus prepared is shown in FIG. 3, which may confirm that the TaPtTe$_5$ phase is successfully synthesized. The pellet sample includes the phases for PtTe$_2$ and TaTe$_2$ but they are eliminated by the following thermal treatment, and the final pellet may include the single phase of TaPtTe$_5$.

Example 4: Preparation of TaPtTe$_5$ Polycrystalline Sintered Body II

The TaPtTe$_5$ polycrystalline sintered body of Example 3 is annealed at a temperature of 600° C. under vacuum. For the TaPtTe$_5$ polycrystalline sintered body as annealed, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 5: Preparation of TaNiTe$_5$ Polycrystalline Sintered Body I

In a glove box, a tantalum (Ta) powder (purity: 99.5%, manufacturer: Sigma Aldrich Co., Ltd.), a nickel (Ni) powder (purity: 99.5%, manufacturer: Sigma Aldrich Co., Ltd.), and tellurium (purity: 99.99%, manufacturer: 5N Plus Co., Ltd.) are mixed at a mole ratio of 1:1:5 to provide a mixture. The prepared mixture is introduced into a quartz glass tube, and the tube is sealed under a vacuum condition. The quartz glass tube is introduced into a box furnace and heated at a heating rate of 100° C./h to 1100° C., and is maintained at the same temperature for 24 hours and is slowly cooled at a rate of 2° C./h to room temperature to obtain a TaNiTe$_5$ polycrystalline sintered body. The resulting product is heat-treated again for 48 hours at a temperature of 600° C. to obtain a TaNiTe$_5$ polycrystalline sintered body.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 6: Preparation of TaNiTe$_5$ Polycrystalline Sintered Body II

The TaNiTe$_5$ polycrystalline sintered body of Example 5 is annealed at a temperature of 600° C. under vacuum. For the TaNiTe$_5$ polycrystalline sintered body as annealed, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For the sintered body thus prepared, X-ray diffraction analysis is performed to confirm its crystal structure and the results thereof are summarized in Table 7. The X-ray diffraction spectrum of the sintered body is shown in FIG. 4.

Figure 4:
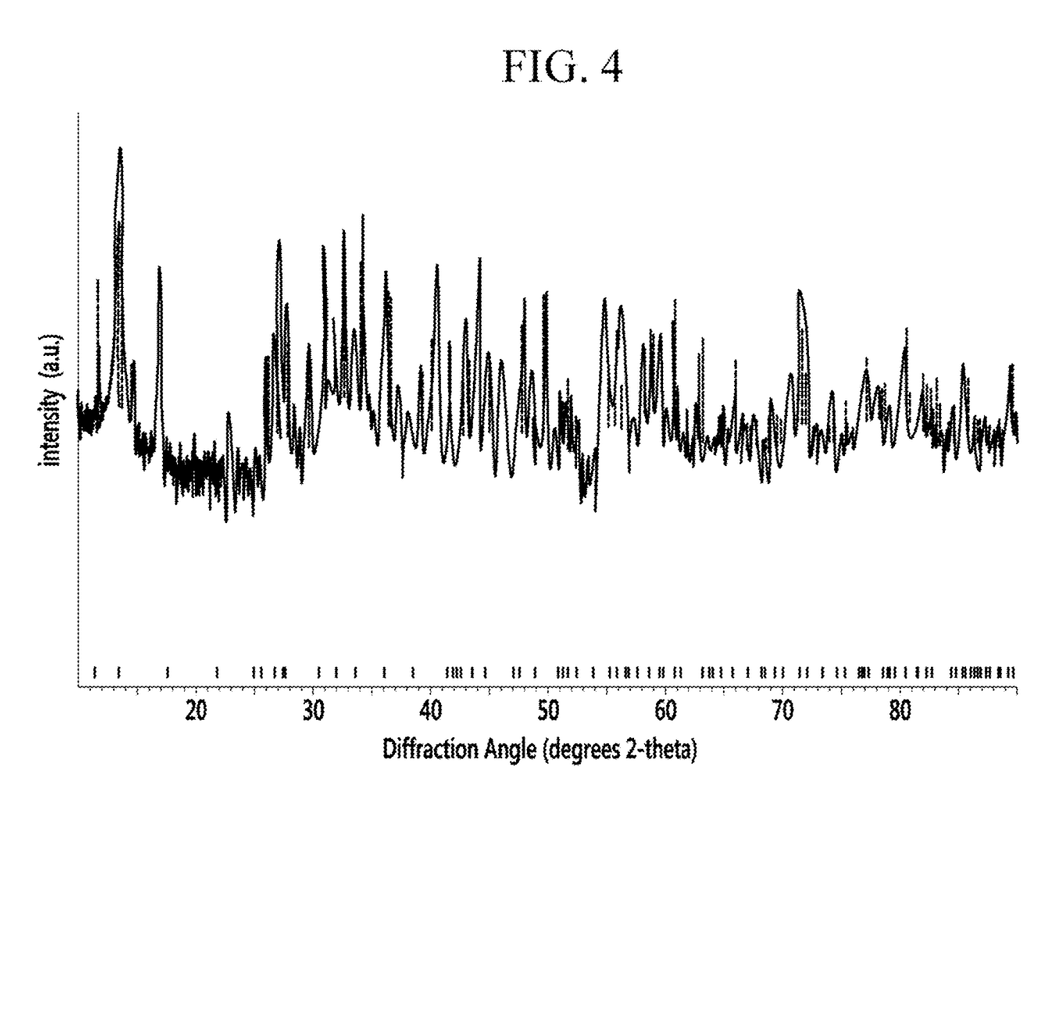
FIG. 4 is a graph of intensity (arbitrary units, a.u.) versus diffraction angle (Degrees 2-theta) which shows an X-ray diffraction spectrum of a TaNiTe$_5$ polycrystal sintered body prepared in Example 1.

The X-ray diffraction spectrum of FIG. 4 confirms that the TaNiTe$_5$ phase is successfully synthesized. A phase for NiTe$_2$ may be present but is eliminated by the following thermal treatment so that the final product includes a single phase.

Example 7: Preparation of NbCoTe$_2$ Polycrystalline Sintered Body

A NbCoTe$_2$ polycrystalline sintered body is prepared in the same manner set forth in Example 1, except that in a glove box, a niobium (Nb) powder (purity: 99.9%, manufacturer: Heraeus Co., Ltd.), a cobalt (Co) powder (purity: 99.9%, manufacturer: Sigma Aldrich Co., Ltd.), and tellurium (purity: 99.99%, manufacturer: 5N Plus Co., Ltd.) are mixed at a mole ratio of 1:1:2 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 8: Preparation of $NbNiTe_2$ Polycrystalline Sintered Body

A $NbNiTe_2$ polycrystalline sintered body is prepared in the same manner set forth in Example 1, except that in a glove box, a niobium (Nb) powder (purity: 99.5%, manufacturer: Heraeus Co., Ltd.), a nickel (Ni) powder (purity: 99.5%, manufacturer: Sigma Aldrich Co., Ltd.), and tellurium (purity: 99.99%, manufacturer: 5N Plus Co., Ltd.) are mixed at a mole ratio of 1:1:2 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 9: Preparation of $NbFeTe_2$ Polycrystalline Sintered Body

A $NbFeTe_2$ polycrystalline sintered body is prepared in the same manner set forth in Example 1, except that in a glove box, a niobium (Nb) powder (purity: 99.5%, manufacturer: Heraeus Co., Ltd.), an iron (Fe) powder (purity: 99%, manufacturer: Sigma Aldrich Co., Ltd.), and tellurium (purity: 99.99%, manufacturer: 5N Plus Co., Ltd.) are mixed at a mole ratio of 1:1:2 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 10: Preparation of $TaCoTe_2$ Polycrystalline Sintered Body

A $TaCoTe_2$ polycrystalline sintered body is prepared in the same manner set forth in Example 1, except that in a glove box, a tantalum (Ta) powder (purity: 99.5%, manufacturer: Heraeus Co., Ltd.), a cobalt (Co) powder (purity: 99%, manufacturer: Sigma Aldrich Co., Ltd.), and tellurium (purity: 99.99%, manufacturer: 5N Plus Co., Ltd.) are mixed at a mole ratio of 1:1:2 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 11: Preparation of $TaNiTe_2$ Polycrystalline Sintered Body

A $TaNiTe_2$ polycrystalline sintered body is prepared in the same manner set forth in Example 1, except that in a glove box, a tantalum (Ta) powder (purity: 99.5%, manufacturer: Heraeus Co., Ltd.), a nickel (Ni) powder (purity: 99%, manufacturer: Sigma Aldrich Co., Ltd.), and tellurium (purity: 99.99%, manufacturer: 5N Plus Co., Ltd.) are mixed at a mole ratio of 1:1:2 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 12: Preparation of $Nb_3SiTe_6$ Polycrystalline Sintered Body

A $Nb_3SiTe_6$ polycrystalline sintered body is prepared in the same manner set forth in Example 1, except that in a glove box, a niobium (Nb) powder (purity: 99.5%, manufacturer: Heraeus Co., Ltd.), a silicon (Si) powder (purity: 99%, manufacturer: Sigma Aldrich Co., Ltd.), and tellurium (purity: 99.99%, manufacturer: 5N Plus Co., Ltd.) are mixed at a mole ratio of 3:1:6 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

Example 13: Preparation of $Nb_3GeTe_6$ Polycrystalline Sintered Body

A $Nb_3GeTe_6$ polycrystalline sintered body is prepared in the same manner set forth in Example 1, except that in a glove box, a niobium (Nb) powder (purity: 99.5%, manufacturer: Heraeus Co., Ltd.), a germanium (Ge) powder (purity: 99%, manufacturer: Sigma Aldrich Co., Ltd.), and tellurium (purity: 99.99%, manufacturer: 5N Plus Co., Ltd.) are mixed at a mole ratio of 3:1:6 to provide a mixture.

For the obtained sintered body, electrical conductivity is measured using ULVAC-Riko ZEM-3 equipment according to the DC 4 terminal method, the bottom electrode method, and the micro-4-point probe method under the conditions of room temperature/normal pressure, respectively, and the measured values are cross-confirmed. The results are compiled in Table 7.

For some of the sintered bodies thus prepared, X-ray diffraction analysis is performed to confirm its crystal structure and the results thereof are summarized in Table 7.

TABLE 7

| | Composition | Synthesis | Crystal structure (confirmed by XRD analysis) | σ (S/cm) |
|---|---|---|---|---|
| Example 1 | NbPdTe$_5$ | 1$^{st}$ synthesis | PNMA (62) | 9143 |
| Example 2 | NbNiTe$_5$ | 1$^{st}$ synthesis | CMCM (63) | 12715 |
| Example 3 | TaPtTe$_5$ | 2$^{nd}$ synthesis | CMCM (63) | 12619 |
| Example 4 | TaPtTe$_5$ | 2$^{nd}$ synthesis and annealing thereafter | CMCM (63) | 13040 |
| Example 5 | TaNiTe$_5$ | 2$^{nd}$ synthesis | CMCM (63) | 15177 |
| Example 6 | TaNiTe$_5$ | 2$^{nd}$ synthesis and annealing thereafter | CMCM (63) | 15830 |
| Example 7 | NbCoTe$_2$ | 1$^{st}$ synthesis | Cmca (64) | 1631 |
| Example 8 | NbNiTe$_2$ | | Pma2 (28) | 1706 |
| Example 9 | NbFeTe$_2$ | | Pmna (53) | 895 |
| Example 10 | TaCoTe$_2$ | | P21/c (14) | 1176 |
| Example 11 | TaNiTe$_2$ | | Pmna (53) | 2876 |
| Example 12 | Nb$_3$SiTe$_6$ | | PNMA (62) | 956 |
| Example 13 | Nb$_3$GeTe$_6$ | | PNMA (62) | 1091 |

The results of Table 7 confirm that the ternary chalcogenide compound of the examples may show a very high level of electrical conductivity. The sintered body prepared by the re-heating after the first synthesis (heat-treating) (i.e., the sintered body prepared from the second synthesis) may have higher conductivity.

The electrical conductivity of the polycrystalline TaPtTe$_5$ sintered body of Example 3 is measured to be 13,040 S/cm, but it may further increase (e.g., to 20,000 S/cm or higher) when it is prepared as a monocrystalline material or is subjected to a post-process for orientation of the crystalline direction (e.g., annealing). Likewise, the electrical conductivity of the polycrystalline TaNiTe$_5$ sintered body of Example 6 is measured to be 15,830 S/cm, but it may further increase (e.g., to 17,500 S/cm or higher) when it is prepared as a monocrystalline material or is subjected to a post-process for orientation of the crystalline direction (e.g., annealing).

Example 14: Manufacture of TaPtTe$_5$ Thin Film

Pulsed laser deposition (PLD) is conducted on an Al$_2$O$_3$ substrate under the following conditions using the TaPtTe$_5$ sintered body prepared from Example 3 as a target and using a Nd/YAG laser.

PLD device: PLD 5000 Deposition Systems, PVD Products

Output: 60 mJ/cm$^2$
Time: 20 min
Substrate temperature: 600° C.
Vacuum degree: 2*10$^{-6}$ Pa The obtained TaPtTe$_5$ deposition film has a thickness of about 20 nm.

Example 15: Manufacture of Thin Film Including TaPtTe$_5$ Nanosheets

The TaPtTe$_5$ sintered body prepared from Example 3 is pulverized, and 0.1 g of the obtained powder is dispersed in 100 mL of butyllithum solution (1.6 M) in hexane including butyllithium dissolved therein, and the resulting dispersion is agitated for 72 hours. Then, the resulting product is taken out from the dispersion and washed with hexane and dried under an argon atmosphere to obtain lithium intercalated powder of TaPtTe$_5$. 15-20 g of lithium intercalated powder of TaPtTe$_5$ is placed in a vial in a glove box, and then 5-10 mL of water is added thereto and the resulting mixture is subjected to ultrasonication for one hour. With the generation of hydrogen gas, interlayer separation occurs to provide TaPtTe$_5$ nanosheets.

The nanosheets thus obtained are centrifuged and the precipitate is washed with water and centrifuged again.

The obtained nanosheet precipitate is placed in a vial and added with 3 mL of deionized water and ultrasonicated. 2-3 mL of toluene is added thereto, and the vial is stirred to provide a thin film including nanosheets at the interface between the aqueous layer and the toluene layer. A glass substrate treated with oxygen plasma is slightly dipped into the interface and pulled up so that a film including the TaPtTe$_5$ nanosheets present at the interface is spread on the glass substrate.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrically conductive thin film, comprising
a compound represented by any of Chemical Formulas 2 to 10, or a combination thereof:

AMTe$_z$      Chemical Formula 2 wherein A is V, Nb, or Ta, M is Ni, Co, Fe, Pd, Pt, Ir, Rh, Si, or Ge, and z is 2 or 5;

A$_3$MTe$_6$      Chemical Formula 3 wherein A is V, Nb, or Ta, and M is Si or Ge;

A$_2$MTe$_4$      Chemical Formula 4 wherein A is V, Nb, or Ta, and M is Si or Ge;

AMTe$_4$      Chemical Formula 5 wherein A is V, Nb, or Ta, and M is Pd, Pt, Ir, Rh, or Ir;

AM$_2$Te$_2$      Chemical Formula 6 wherein A is V, Nb, or Ta, and M is Ni, Co, or Fe;

A$_3$M$_3$Te$_{14}$      Chemical Formula 7 wherein A is V, Nb, or Ta, and M is Ni, Co, Fe, Pd, Pt, Ir, or Rh;

AM$_x$Te$_3$      Chemical Formula 8 wherein A is V, Nb, or Ta, M is Ni, Co, Fe, Pd, Pt, Ir, or Rh, and x is 1 or 2;

A$_2$M$_3$Te$_5$      Chemical Formula 9 wherein A is V, Nb, or Ta, and M is Ni, Co, Fe, Pd, Pt, Ir, or Rh; and

A$_2$MCh$_z$      Chemical Formula 10 wherein A is V, Nb, or Ta, M is Ni, Co, Fe, Pd, Pt, Ir, or Rh, Ch is S or Se, and z is 5 or 6, wherein the thin film has a thickness of less than or equal to 50 nanometers, and
wherein the thin film has light transmittance of greater than or equal to about 80 percent for light having a wavelength of 550 nanometers.

2. The electrically conductive thin film of claim 1, wherein the compound comprises $NbPdTe_5$, $NbNiTe_5$, $TaPtTe_5$, $TaNiTe_5$, $NbCoTe_2$, $NbNiTe_2$, $NbFeTe_2$, $TaCoTe_2$, $TaNiTe_2$, $Nb_3SiTe_6$, $Nb_3GeTe_6$, $Nb_2SiTe_4$, $Nb_2GeTe_4$, $TaRuTe_4$, $TaRhTe_4$, $TaIrTe_4$, $NbIrTe_4$, $TaCo_2Te_2$, $TaNi_2Te_2$, $Ta_3Pd_3Te_{14}$, $TaFeTe_3$, $TaNi_2Te_3$, $Ta_2Pd_3Te_5$, $Ta_2PdS_6$, $Ta_2PdSe_6$, $Ta_2NiSe_6$, $Ta_2NiS_6$, $Nb_2PdSe_6$, $Nb_2PdS_6$, or a combination thereof.

3. The electrically conductive thin film of claim 1, wherein the electrically conductive thin film has an electrical conductivity of greater than or equal to about 1000 Siemens per centimeter.

4. The electrically conductive thin film of claim 1, wherein the electrically conductive thin film has an electrical conductivity of greater than or equal to about 6000 Siemens per centimeter.

5. The electrically conductive thin film of claim 1, wherein a product of $\alpha$ and $\rho$ is less than or equal to about 200 ohms per square, wherein $\alpha$ is an absorption coefficient of the compound for light having a wavelength of 550 nm and $\rho$ is a resistivity of the compound.

6. The electrically conductive thin film of claim 1, wherein a product of $\alpha$ and $\rho$ is less than or equal to about 20 ohms per square, wherein $\alpha$ is an absorption coefficient of the compound for light having a wavelength of 550 nm and $\rho$ is a resistivity of the compound.

7. The electrically conductive thin film of claim 1, wherein the layered crystal structure belongs to an orthorhombic system and has a space group of Cmcm; or an orthorhombic system and has a space group of Pnma; or an orthorhombic system and has a space group of Cmca; or an orthorhombic system and has a space group of Pma2; or an orthorhombic system and has a space group of Pmna; or a monoclinic system and has a space group of $P2_1/c1$; or a monoclinic system and has a space group of C2/m; or a monoclinic system and has a space group of I12/m1; or a monoclinic system and has a space group of C2/c.

8. The electrically conductive thin film of claim 1, which comprises a plurality of nanosheets comprising the compound represented by Chemical Formula 1, wherein the nanosheets contact one another to provide an electrical connection therebetween.

9. The electrically conductive thin film of claim 1, wherein the thin film is a continuous deposition film including the compound represented by Chemical Formula 1.

10. An electronic device comprising an electrically conductive thin film comprising a compound represented by any of Chemical Formulas 2 to 10, or a combination thereof:

$$AMTe_z \qquad \text{Chemical Formula 2}$$

wherein A is V, Nb, or Ta, M is Ni, Co, Fe, Pd, Pt, Ir, Rh, Si, or Ge, and z is 2 or 5;

$$A_3MTe_6 \qquad \text{Chemical Formula 3}$$

wherein A is V, Nb, or Ta, and M is Si or Ge;

$$A_2MTe_4 \qquad \text{Chemical Formula 4}$$

wherein A is V, Nb, or Ta, and M is Si or Ge;

$$AMTe_4 \qquad \text{Chemical Formula 5}$$

wherein A is V, Nb, or Ta, and M is Pd, Pt, Ir, Rh, or Ir;

$$AM_2Te_2 \qquad \text{Chemical Formula 6}$$

wherein A is V, Nb, or Ta, and M is Ni, Co, or Fe;

$$A_3M_3Te_{14} \qquad \text{Chemical Formula 7}$$

wherein A is V, Nb, or Ta, and M is Ni, Co, Fe, Pd, Pt, Ir, or Rh;

$$AM_xTe_3 \qquad \text{Chemical Formula 8}$$

wherein A is V, Nb, or Ta, and B is Ni, Co, Fe, Pd, Pt, Ir, or Rh, x is 1 or 2; or $$A_2M_3Te_5 \qquad \text{Chemical Formula 9}$$

wherein A is V, Nb, or Ta, and M is Ni, Co, Fe, Pd, Pt, Ir, or Rh; and $$A_2MCh_z \qquad \text{Chemical Formula 10}$$

wherein A is V, Nb, or Ta, M is Ni, Co, Fe, Pd, Pt, Ir, or Rh, Ch is S or Se, and z is 5 or 6,
wherein the thin film has a thickness of less than or equal to 50 nanometers, and
wherein the thin film has light transmittance of greater than or equal to about 80 percent for light having a wavelength of 550 nanometers.

11. The electronic device of claim 10, wherein the electrically conductive thin film comprises $NbPdTe_5$, $NbNiTe_5$, $TaPtTe_5$, $TaNiTe_5$, $NbCoTe_2$, $NbNiTe_2$, $NbFeTe_2$, $TaCoTe_2$, $TaNiTe_2$, $Nb_3SiTe_6$, $Nb_3GeTe_6$, $Nb_2SiTe_4$, $Nb_2GeTe_4$, $TaRuTe_4$, $TaRhTe_4$, $TaIrTe_4$, $NbIrTe_4$, $TaCo_2Te_2$, $TaNi_2Te_2$, $Ta_3Pd_3Te_{14}$, $TaFeTe_3$, $TaNi_2Te_3$, $Ta_2Pd_3Te_5$, $Ta_2PdS_6$, $Ta_2PdSe_6$, $Ta_2NiSe_6$, $Ta_2NiS_6$, $Nb_2PdSe_6$, $Nb_2PdS_6$, or a combination thereof.

12. The electronic device of claim 10, wherein the electrically conductive thin film has an electrical conductivity of greater than or equal to about 1000 Siemens per centimeter, and a product of $\alpha$ and $\rho$ is less than or equal to about 200 ohms per square, wherein $\alpha$ is an absorption coefficient of the compound for light having a wavelength of 550 nm and $\rho$ is a resistivity of the compound.

13. The electronic device of claim 10, wherein the electrically conductive thin film has electrical conductivity of greater than or equal to about 6000 Siemens per centimeter, and a product of $\alpha$ and $\rho$ is less than or equal to 20 ohms per square, wherein $\alpha$ is an absorption coefficient of the compound for light having a wavelength of 550 nm and $\rho$ is a resistivity of the compound.

14. The electronic device of claim 10, wherein the electrically conductive thin film comprises a plurality of nanosheets comprising the compound represented by Chemical Formula 1, and wherein the nanosheets contact one another to provide an electrical connection therebetween.

15. The electronic device of claim 10, wherein the electronic device is a flat panel display, a touch screen panel, a solar cell, an e-window, an electrochromic mirror, a heat mirror, a transparent transistor, or a flexible display.

* * * * *